United States Patent [19]

Metcalf

[11] 4,083,052

[45] Apr. 4, 1978

[54] ELECTRONIC TACHOGRAPH

[75] Inventor: Wilbur F. Metcalf, Springfield, Ill.

[73] Assignee: Sangamo Electric Company, Springfield, Ill.

[21] Appl. No.: 696,814

[22] Filed: Jun. 16, 1976

[51] Int. Cl.[2] .................. G01D 9/30; G01D 5/244; G01P 1/08

[52] U.S. Cl. .................. 346/18; 235/92 DN; 324/171; 346/33 D; 346/121

[58] Field of Search .................. 346/33 D, 18, 32, 121; 324/171, 169, 166; 235/151.32, 92 TF, 92 DN, 92 FQ; 318/685

[56] References Cited

U.S. PATENT DOCUMENTS

| | | | |
|---|---|---|---|
| 2,982,594 | 5/1961 | Riegger | 346/18 |
| 3,525,044 | 8/1970 | Richmond | 324/173 |
| 3,614,617 | 10/1971 | Blake | 324/171 |
| 3,739,270 | 6/1973 | Miller | 324/171 X |
| 3,746,985 | 7/1973 | Perron | 324/171 X |
| 3,970,931 | 7/1976 | Novak | 318/685 X |

*Primary Examiner*—Joseph W. Hartary

*Attorney, Agent, or Firm*—Emrich, Root, O'Keeffe & Lee

[57] ABSTRACT

An electronic tachograph for providing a chart recording of the speed of a vehicle and the distance travelled by the vehicle in relation to time includes an input transducer coupled to the vehicle drive to provide distance pulses representing the distance travelled by the vehicle, a sampling circuit which samples the distance pulses at a predetermined rate and provides pulses to a speed counter and a distance counter which responsively provide control outputs representative of the speed of the vehicle and the distance travelled by the vehicle for controlling stepping motors which effect the positioning of a speedometer shaft and the incrementing of an odometer, and for moving a speed stylus and an odometer stylus on a recording chart which is driven by a further stepping motor controlled by outputs of a time base generator which supplies timing pulses to the sampling circuit and the speed control circuits.

30 Claims, 13 Drawing Figures

BATTERY
BATTERY
SPEED DRIVE
P/M

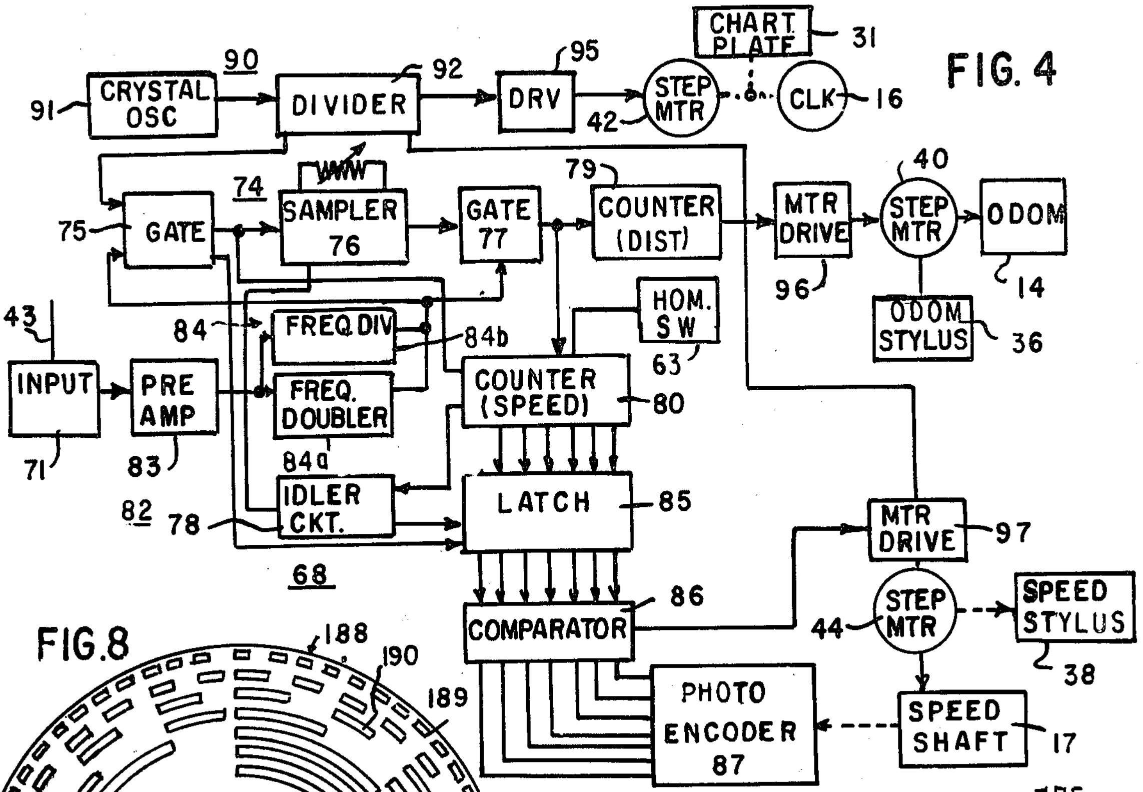
FIG. 4
FIG. 8
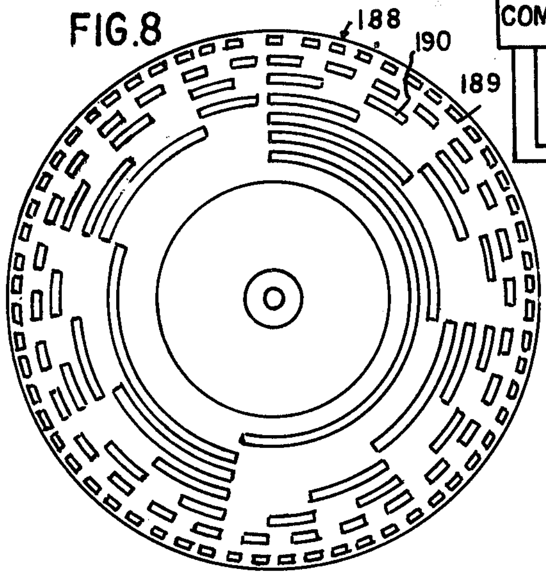
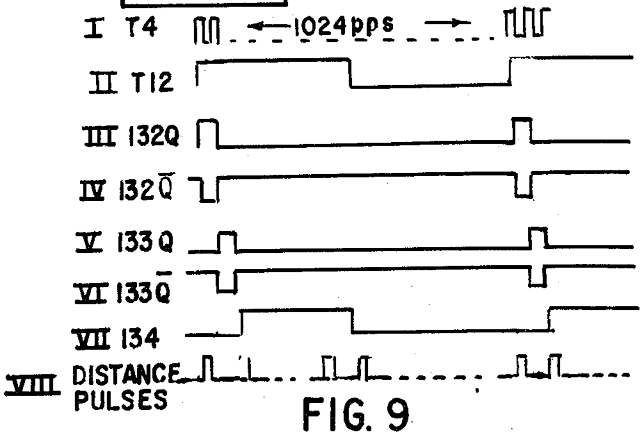
FIG. 9
FIG. 10
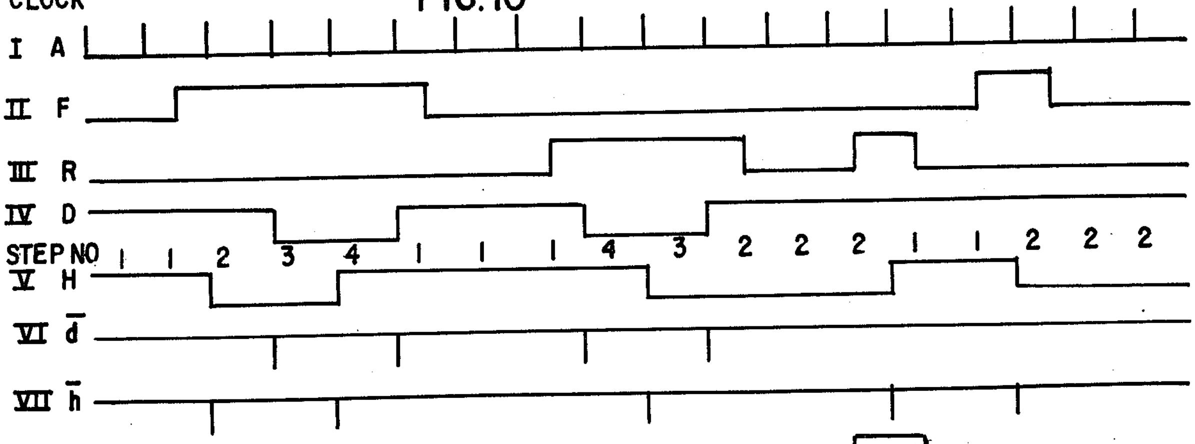
FIG. 11
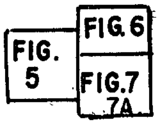

ELECTRONIC TACHOGRAPH

BACKGROUND OF THE INVENTION

1. Field of the Invention

This invention relates to graphical recording apparatus, and more particularly, to an electronic tachograph unit for use with a vehicle for recording the distance travelled by the vehicle, the speed of the vehicle, and similar data in relation to time.

2. Description of the Prior Art

Tachograph units are employed in the transportation industry to obtain graphical records which are useful in determining vehicle operating costs, operator performance and vehicle scheduling. In the trucking industry, for example, tachograph units are used to provide a chart record of vehicle speed and distance travelled in relation to time. The chart record also indicates idling time, lugging, loading and unloading times, stopping times and the like.

Commercially available tachograph units include a circular chart recorder, or a strip recorder, which provides a graphical representation of vehicle speed in units of miles (or kilometers) per hour (or engine speed in unit of revolutions per minute), and the distance travelled by the vehicle. The chart recorder is driven by a conventional clock mechanism which, in the case of a circular chart recorder, effects rotation of a paper chart relative to a speed stylus and an odometer stylus to permit recording of speed and distance information on the chart during a given time interval, typically a 24 hour period.

The speed stylus and the odometer stylus are coupled to the speed drive of the vehicle by a drive linkage which also drives a conventional speedometer and an odometer of the tachograph unit. Known tachograph units require complex mechanical linkages including correction gearing and lever assemblies to convert the output of the drive linkage, which is typically a flexible shaft which is rotated in direct relation to the speed of the vehicle or speed of the engine, to a form suitable for driving the recording and indicating apparatus of the tachograph unit. The flexible shaft and reduction gearing have limited life in the field and result in repetitive maintenance and a significant increase in vehicle down time.

A further consideration is that the input drive for tachograph units presently available is derived from a geared output on the vehicle such as an output from the vehicle engine transmission, drive shaft wheel and the like which is representative of the engine or vehicle speed. However, since the geared outputs may vary over a wide range, typically 500 to 1500 revolutions per mile, it is frequently necessary to tailor the input drive linkage for a given tachograph unit to a given vehicle by providing correctional mechanical gearing. Even with such compensation, when the vehicle is equipped with oversize or undersize tires, the unit drive will not provide an accurate representation of distance travelled, and erroneous recordings will be provided.

Accordingly, it would be desirable to have a tachograph unit which is readily adjustable for use with vehicles having different geared outputs. It would also be desirable to have a tachograph unit which does not require the use of a rotating flexible shaft or correctional mechanical gearing, thereby minimizing maintenance costs and vehicle and driver idle time.

In the field, anti-skid devices are commercially available from a number of manufacturers for use on vehicles, and provide an electrical output which is representative of the speed of the vehicle. While it would be desirable to use such output to drive a tachograph, it is apparent that the output signal provided by anti-skid devices of different manufacturers will vary, and the variation in wheel size and tire size of different vehicles is such that the nature of the output signal provided by the anti-skid device for a vehicle will vary significantly. It is desirable, therefore, to provide a tachograph unit which is conveniently adjustable to accept any of the outputs provided by the different units, and utilize such output to provide accurate speed and distance recording.

SUMMARY OF THE INVENTION

It is therefore an object of the present invention to provide a tachograph unit including electrical circuitry connected between the speed representative output of the vehicle and the indicating and recording apparatus of the tachograph unit, which circuitry is conveniently adjustable to permit the use of the tachograph unit with vehicles having different speed representative outputs, whereby the rotating flexible shafts now conventionally used are eliminated.

Another object of the invention is to provide a tachograph unit which includes an electronic time reference source which provides a precise time base for the recording apparatus, and eliminates the need for winding the mechanical clock which is conventionally used as a drive source for the recording chart on most available tachographs.

Yet another object of the invention is to provide a tachograph unit which eliminates mechanical correctional gearing presently required in adapting the tachograph unit for use with different speed representative outputs.

A further object of the invention is to provide a tachograph unit which may be used with the electrical output of anti-skid devices used on vehicles.

Yet another object of the invention is to provide a tachograph unit which utilizes fewer moving parts, and particularly mechanical parts which are required to operate at high speeds, to thereby minimize wear and thereby achieve an improvement in life expectancy and reliability.

These and other objects are achieved by the present invention which has provided a tachograph unit having electronic control circuits which provide drive signals for controlling the operation of a chart recording apparatus, and indicating apparatus, including a speedometer and an odometer, of the tachograph unit. In accordance with the present invention, the tachograph unit includes input means for providing distance pulses indicative of the distance travelled by a vehicle, timing means operable to provide timing pulses, first means for deriving from said timing pulses a first output indicative of time, adjustable means responsive to said distance pulses to provide a predetermined number of pulses for a predetermined distance of travel, second means responsive to said predetermined pulses for deriving a second output indicative of the speed of said vehicle, and third means responsive to said predetermined pulses to provide a third output indicative of the distance travelled by said vehicle.

In a disclosed embodiment, the adjustable means comprises a gating means which receives the pulses provided by the input means, and sampling means responsive to enabling signals provided by the timing means to periodically enable the gating means to pass the distance pulses to the second and third means during each sampling period. The sampling means defines the duration of the sampling period which is adjustable to permit a predetermined number of distance pulses to be passed by the gating means during a given sampling period for a predetermined distance of travel by the vehicle. The input means, which extends the distance pulses to the gating means, includes a frequency divider means which is employed when the tachograph unit is used in a vehicle having a vehicle speed ratio greater than 2000 rev/mile and a frequency doubler means which is employed when the tachograph unit is used in a vehicle having an engine speed ratio less than 1000 rev/mile. For vehicles having engine speed ratios between 1000 and 2000 rev/mile, the frequency divider means and the frequency doubler means are bypassed.

The second means includes first pulse counter means, which counts the pulses extended thereto, and for each sampling period, the number of pulses counted corresponds to the speed of the vehicle in units of distance per hour. The third means includes second pulse counter means which is responsive to pulses extended thereto to provide control pulses the number of which is indicative of the distance travelled by the vehicle. The first and second counter means provide control outputs to speed drive and odometer drive means for driving chart recording apparatus and the odometer and speedometer apparatus of the tachograph unit.

A first stepping motor is responsive to the output provided by the first means to provide drive for the chart recording drive apparatus for rotating a recording chart past an odometer stylus, and event stylus and speed stylus at a given rate, typically one revolution in a given twenty-four hour period. The stepping motor also drives a clock of the tachograph unit.

The odometer drive means includes another stepping motor, which is mechanically linked to a conventional odometer mechanism and to an odometer stylus, is operated in accordance with control pulses provided by the second counter means to increment the odometer reading and to effect movement of the odometer stylus on the recording chart for recording the distance travelled by the vehicle.

A reversible stepping motor, which is mechanically linked to the speedometer shaft and to the speed stylus, is operable in accordance with control pulses provided by the first counter means to effect movement of the speed stylus on the recording chart to record vehicle speed and to effect rotation of the speed shaft to position a speedometer pointer for indicating vehicle speed.

The positioning of the speed stylus and the speed shaft is effected by way of a comparator means which compares the state of the first pulse counter means at the end of each sampling period, indicative of the measured speed of the vehicle, with outputs of an encoder means which provides coded output signals indicative of the current position of the speed shaft and thus the indicated and recorded speed of the vehicle.

When the vehicle is travelling at a constant speed, the state of the first pulse counter means corresponds to the output of the encoder means and no change is effected in the position of the speed shaft. In the event of an increase or decrease in the speed of the vehicle, a corresponding change is provided in the state of the first pulse counter means, and the comparator means is responsive to such change to provide a suitable drive command to the reversible stepping motor to effect a correction in the position of the speedometer shaft to reflect the change in vehicle speed.

The comparator means includes a memory means which stores the previous drive command for the reversible stepping motor to enable comparison of previous drive commands with the output of the comparator means thereby enabling energization of the reversible stepping motor for forward or reverse operation to effect rotation of the speed shaft in the direction required to indicate measured speed of the vehicle.

In a disclosed embodiment, the encoder means comprises a photo-optical encoder means including a coded disc which is carried by the speed shaft and interposed between a light source means and a light detecting means which enable the encoder means to provide a coded output word indicative of the position of the shaft. The code disc may comprise a plastic sheet having the code image photographically reproduced on the plastic sheet, thereby reducing the inertia of the assembly, improving the response time, and simplifying manufacture of the code disc.

An idler circuit means samples the output of the first counter means and provides a control output to the comparator means whenever the vehicle is idling to effect the recording on the recording chart of an indication of the idling time for the vehicle.

In accordance with a disclosed embodiment wherein the speed stepping motor and the speed drive means are mounted within the main body portion of a housing of the tachograph unit, and the chart recording apparatus and speedometer indicating apparatus, including the speedometer pointer, are mounted within a cover member which is hinged to the housing, a mechanical coupling is provided to link the speed shaft with the speedometer pointer when the cover is closed. Whenever the cover is opened, the speed drive is disengaged from the speedometer pointer, which is spring loaded, so that the speedometer pointer returns to zero. A homing switch means, which is operated when the cover member is opened and reclosed permits the first counter means to be reset to a count of zero so as to be indexed with the speedometer pointer.

The use of electronic control circuits and stepping motors to drive the recording and indicating apparatus of the tachograph unit minimizes the number and speed of moving parts in the tachograph unit to provide a graphical record of vehicle speed and distance travelled by the vehicle in addition to conventional speedometer, odometer and clock indications. Accordingly, the tachograph unit provided by the present invention requires less maintenance and has longer life expectancy than tachograph units presently available.

Moreover, the sampling technique and the use of a frequency divider/doubler means enables the tachograph unit to be readily adaptable to vehicles having different vehicle speed ratios without the need for additional mechanical gearing.

DESCRIPTION OF THE DRAWINGS

FIG. 4 is a block diagram of the control circuits for the tachograph unit of the present invention;

FIG. 8 is a plan view of code disc employed by speedometer control apparatus for the tachograph unit;

FIG. 9 is a timing diagram for circuits shown in FIGS. 5–7;

FIG. 10 is a timing diagram for motor control circuits shown in FIG. 7; and,

FIG. 11 shows how FIGS. 5–7 and 7A are to be assembled.

DESCRIPTION OF A PREFERRED EMBODIMENT

General Description

Figure 1:
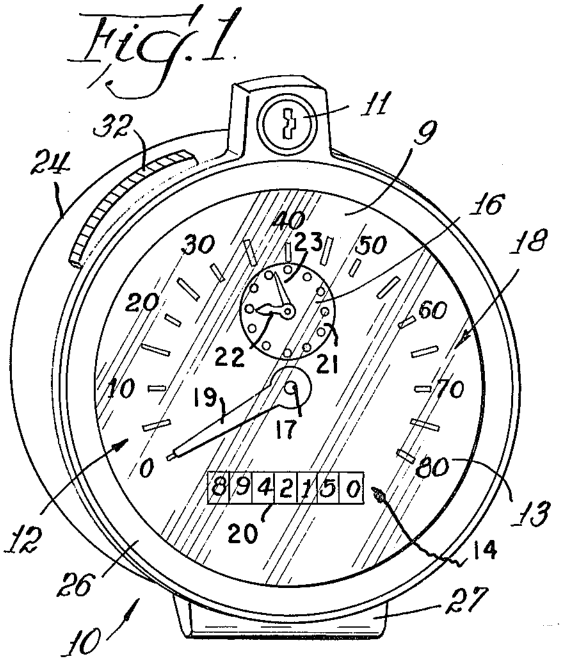
FIG. 1 is a perspective view of a tachograph unit provided by the present invention.
Figure 2A:
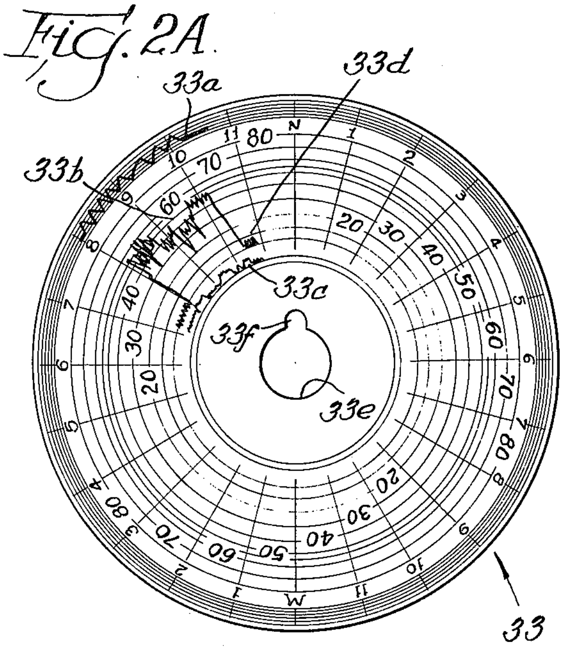
FIG. 2A is a plan view of a recording chart for use with the tachograph unit shown in FIG. 2.
Figure 2:
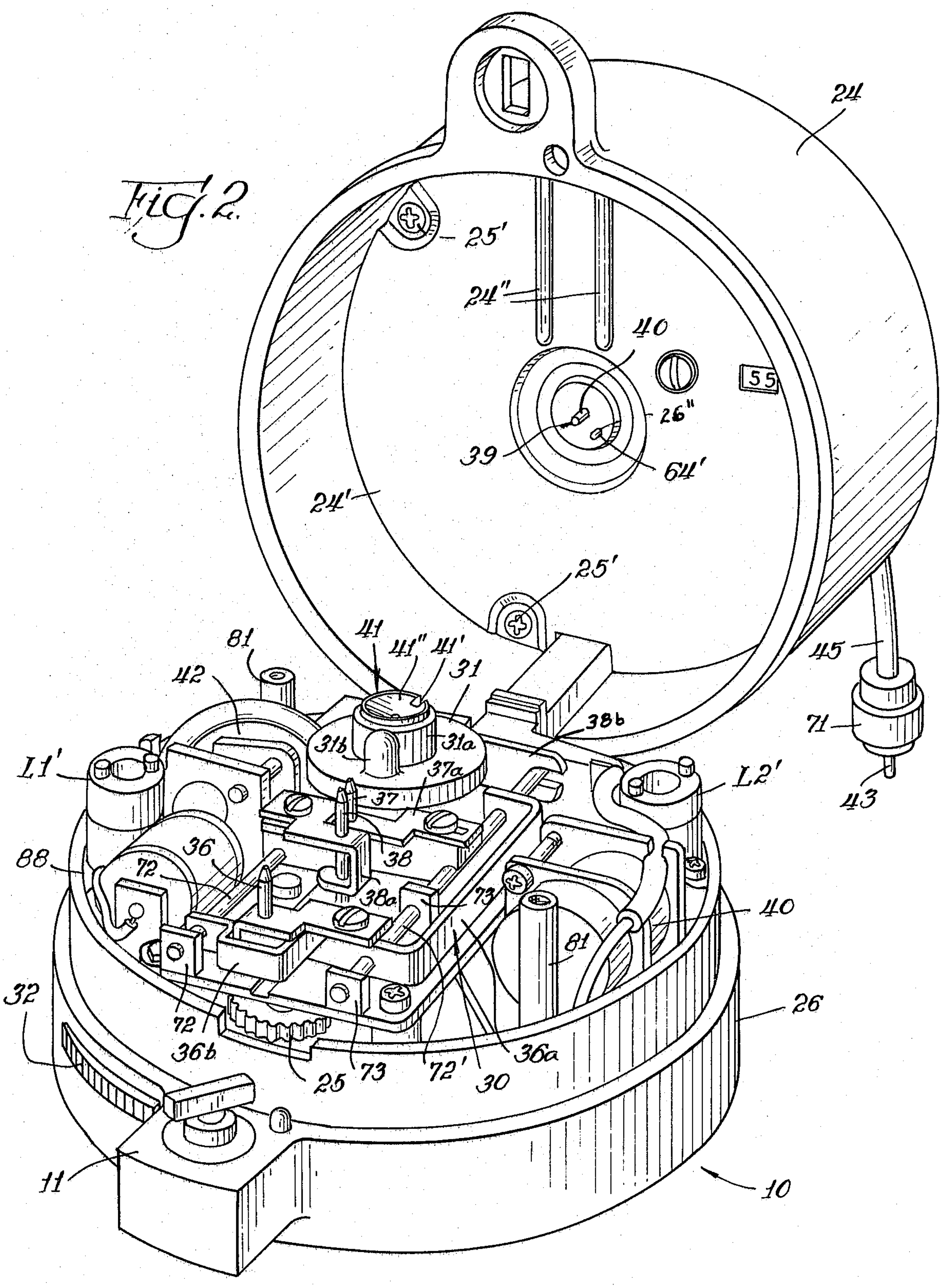
FIG. 2 is a perspective view of the tachograph unit with the cover open showing chart recording and odometer and clock drive apparatus for the unit.

Referring to FIGS. 1 and 2, the tachograph unit 10 provided by the present invention includes a housing 24 and a cover 26 which is attached to the housing by a suitable hinge 27 which permits the cover 26 to be moved between an open position as shown in FIG. 2, and the closed position as shown in FIG. 1. The cover 26 can be locked in the closed position by a key-operated lock 11. The tachograph may be mounted in the dashboard of the vehicle by suitable mounting apparatus (not shown) in a manner known in the art.

A speedometer apparatus 12, an odometer apparatus 14 and a clock 16 are disposed on a forward portion 13 of the cover 26 which is enclosed by a transparent cover plate 9 of glass or another suitable material. The speedometer apparatus 12 includes a speedometer dial plate 18 having mileage divisions disposed along the periphery of the dial plate 18, and a speed indicating needle or pointer 19 which is carried by a speed shaft 17 and movable thereby to indicate the current speed of the vehicle in which the tachograph unit 10 is employed.

The odometer apparatus 14, which is mounted in the lower portion of the forward surface 13 of the cover 26 comprises a conventional mechanical multidigit indicator 20 which registers the number of miles or kilometers travelled by the vehicle. The clock 16, which is mounted in the upper portion of the forward surface 13, includes a clock dial 21 having division marks representing time increments, and an hour hand 22, and a minute hand 23, carried by associated shafts and movable thereby to indicate the time of day. The speedometer dial plate 18, the mileage indicator 20 and the clock dial 21 are illuminated by lamps disposed rearwardly of the dial, plate 18, which are received in lamp sockets L1′ and L2′ shown in FIG. 2.

Referring to FIG. 2, the tachograph unit 10 includes chart recording apparatus, indicated generally at 30, which comprises an odometer stylus 36, an event stylus 37 and a speedometer stylus 38, which extend through a slot in a back plate (not shown) which is mountable on pillars 81 for enclosing the rearward portion of the cover 26. The recording apparatus further includes a rotatable chart plate 31 mounted in the cover 26 and extending through a central aperture in the back plate for carrying a pressure sensitive recording chart 33 such as the one shown in FIG. 2A. The chart plate 31 has a central hub 31*a* and an index member 31*b*, and the chart 31 is positionable on the chart plate 31 with the hub 31a extending through a central aperture 33e of the chart 33 and the index member 31b passing through a notch 33f in the chart 33 for indexing the chart 33 on the chart plate 31. The pressure sensitive side of the chart 33 is positioned adjacent the stylii to permit recording of distance, event and speed information on the chart 33 as the chart is rotated past the odometer stylus 36, the event stylus 37 and the speed stylus 38. Bosses 24″ provided on the outer surface of the cover plate 24′ of the housing 24, engage the back side of the chart 33 in the area in which the stylii 36–38 are located to maintain pressure contact between the chart 33 and the stylii when the cover 26 is closed.

The recording chart 33, shown in FIG. 2A, may be a conventional tachograph chart which permits recording of mileage and speed for a given time period, typically 24 hours. Charts providing other time recording increments, such as 26 hours, may be provided with suitable adjustment of the chart drive to provide one complete revolution of the chart plate 31 in such time period. Also, a plurality of strippable charts may be employed to extend the recording period for a duration of several days or a week, as is known in the art.

The chart 33 has a mileage or distance recording area 33a, disposed around the periphery of the chart, which is divided by five concentric lines, each of which represents one unit of distance, such as a mile or a kilometer. The odometer stylus 36 is positioned to record in this area.

The odometer apparatus 14 and the odometer stylus 36 are driven by a stepping motor 40 which is mounted in the cover 26. An output shaft on motor 40 via mechanical linkage (not shown) drives the odometer apparatus 14 which in turn operates an elongated drive member 36*a* which terminates in a substantially U-shaped portion 36*b*. The stylus 36 is mounted on the portion 36*b* of the drive member 36*a*, and movable therewith along a pair of guide rails 72 and 72′ which are supported in the cover member 26 by upwardly extending tab members including tab members 73 as shown in FIG. 2.

As the odometer stylus 36 is moved over the recording area 33*a*, there is provided an oscillatory graph. When the vehicle is moving at a constant speed, for example, a series of sawtooths are drawn, and each complete sawtooth represents ten miles of travel, as is known in the art.

A further stepping motor 42, which is mounted within the cover 26, drives the clock 16 and the chart plate 31. An adjustment wheel 26 enables setting of the clock 16 and the chart plate 31 in synchronism.

With reference to FIGS. 2 and 2A, the event stylus 37 which is disposed adjacent an event recording area 33c on the chart 33, extending near the center of the chart 33, is carried by a drive member 37*a*, which is slidably movable on rails 72 and 72′, and which is coupled to a shaft of a solenoid 88 by way of a lever arm (not shown). A manually operated event switch 32 is coupled to the lever arm for raising or lowering the position of the event stylus 37 to permit recording of information in three different positions as indicated at 33*c* in FIG. 2A. A fourth position of the event stylus 37 which mechanically overrides the three manual positions is provided by electrical activation of solenoid 88 by way of vehicle event switch 88′ (FIG. 7) which represents a function to be monitored and which is operable to connect the solenoid 88 to the vehicle battery 107. A varistor 88'', which is connected in parallel with solenoid 88, provides transient suppression.

The chart 33 further includes a speed recording area **33*b*, disposed over the center portion of the chart, which is divided by lines which represent vehicle speed in units of miles per hour. The speed stylus 38 is carried by a U-shaped support member 38*a* which is secured to a generally L-shaped drive member 38*b*, which is coupled to the speed drive and is movable along rails 72 and 72' as a function of the vehicle speed. As speed revolutions increase or decrease, the speed stylus 38** is moved up or down on the chart, marking the chart to inscribe the instantaneous speed for the vehicle.

Figure 3:
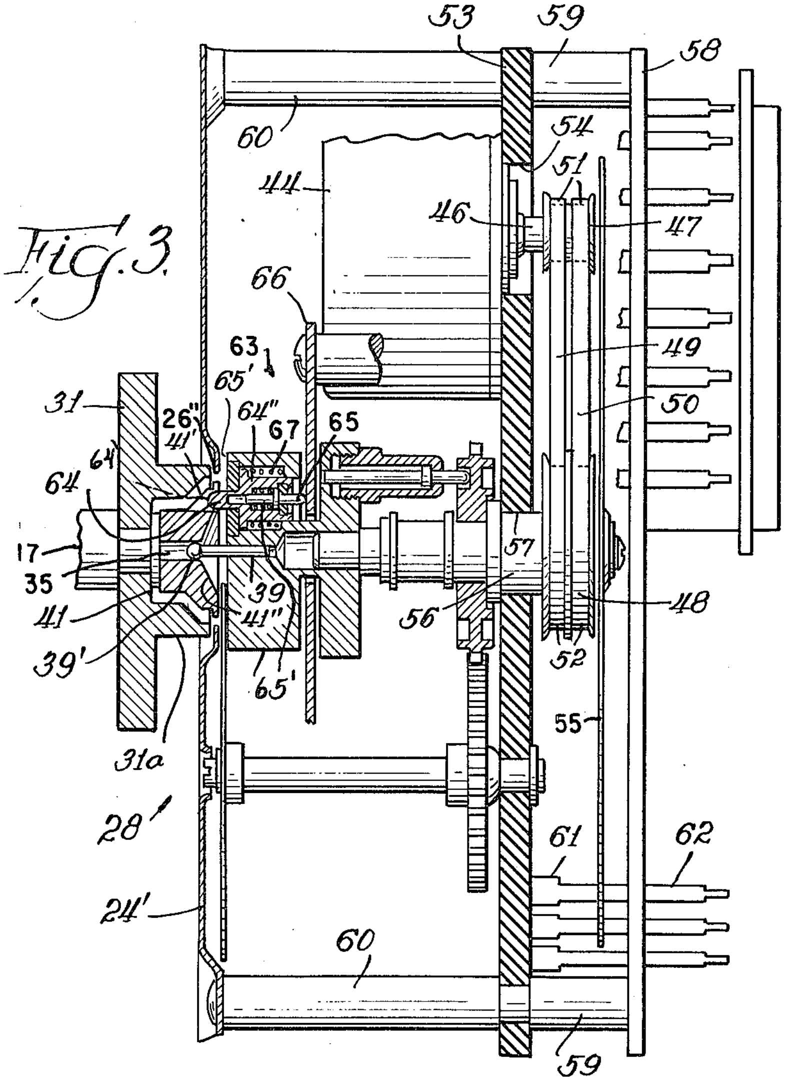
FIG. 3 is a side view of a speedometer control apparatus and shows the physical mounting for the speed servo and control circuits of the tachograph unit.

Referring to FIG. 3, a speed servo apparatus 28 which provides drive for the speed shaft 17 and the speed stylus 38 is mounted in the housing 24. The speed servo apparatus 28 has an output shaft 39 extending through an aperture 40 in a cover plate 24' of the housing 24. The output shaft 39 is coupled to speed shaft 17 by way of a suitable index coupling 41 with the tip 39' of speed shaft 39 being received in a central aperture 35 of the index coupling 41. The speed servo apparatus 28 includes a stepping motor 44 which has a shaft 46 coupled to the speed drive shaft 39 by way of a pair of drive pulleys 47 and 48 and a pair of timing belts 49 and 50 disposed in grooves 51 and 52 of respective pulleys 47 and 48. The stepping motor 44 is mounted on a printed circuit board 53 and the motor shaft 46 extends through aperture 54 in the board 53. One of the pulleys 47 is carried by the motor shaft 46. The other pulley 48 is mounted on the speed shaft 39 which extends through a coupling assembly, and is supported by bearing 56 mounted in aperture 57 in the board 53. The diameter of pulley 48 is two and one half times the diameter of pulley 47, providing a reduction drive to shaft 39, enhancing incremental movement of shaft 39.

The printed circuit board 53, along with a further printed circuit board 58, mount the components of control circuits 68 for the tachograph unit 10. The circuit board 58 is mounted in parallel with board 53 and spaced therefrom by pillars 59. The cover plate 24' for the housing assembly 24 is secured to tapped pillars 60, mounted on board 53 by way of screws 25' (FIG. 2). Terminals 61 of board 53 engage connectors of board 58 to provide interconnections between the circuits disposed on the two boards 53 and 58.

Referring to FIG. 2, a speed input coupling assembly of the tachograph unit 10 includes a transducer 71 which is connected to the speed drive of the vehicle by a drive pin 43, typically at the rear of the vehicle transmission, and a cable 45 which distributes electrical impulses, indicative of the distance travelled and inherently the speed of the vehicle, through the rear of housing 24 from the transducer assembly 71.

Referring to FIG. 3, whenever the cover 26 is opened, the speed shaft 39 is disengaged from the shaft 17 permitting the shaft 17, which is spring loaded, to return the pointer 19 to zero. When the cover 26 of reclosed, a homing switch 63 provides a control output to the electronic control circuits 68 for enabling homing of the speed shaft 39. The homing switch 63 includes a spring loaded switch plunger 64 which moves a contact pin 65 to engage a contact plate 66. The contact plate 66 is electrically connected to an input of a speed counter, shown in FIG. 4, which is operable to control the positioning of the speed shaft 39 in a manner to be described hereinafter. The switch plunger 64, which is of a metallic material, has a drive pin portion 64' extending through an aperture 26'' in the cover plate 24' and normally engages a slot 41' (FIG. 2) in the index coupling member 41 under the force of a spring 67. In such position, the contact pin 65 in maintained out of engagement with the contact plate 66. The contact pin 65, which is also of a metallic material, has a shank portion 65' which extends within a central bore 64'' of a plunger 64 and has spring loaded over-travel.

In the event the cover 26 is opened when the speedometer reading is other than zero, the drive is disengaged and the spring loaded pointer 19 returns to zero. However, the speed shaft 39 remains at a position indicative of the vehicle speed as indicated by the pulse output of the transducer 71. When the cover 26 is reclosed, the drive pin portion 64' rides on a rim portion 41'' of the concave index coupling member 41, driving the contact pin 65 into engagement with the contact plate 66. A ground on the speed shaft 39, extended to the contact pin 65 over the plunger 64, is thus provided to the contact plate 66 for controlling the speed counter to effect rotation of the speed shaft 39 until drive pin 64' falls into slot 41', whereupon plunger 64 is moved under the force of spring 64, moving contact pin 65 out of engagement with contact plate 66 thereby removing the ground from the speed counter input.

Control Circuits

Referring to FIG. 4, which is a block diagram of the tachograph control circuits 68, the input transducer 71 is operable as an analog-to-digital converter to convert rotational motion of the drive shaft 43 to output pulses at a frequency related to the distance travelled by the vehicle. Control outputs derived from the output or distance pulses control the operation of the odometer stepping motor 40 and the speedometer stepping motor 44. The control pulses are derived from the distance pulses by an adjustable timer circuit 74, including a sampling circuit 76 and gate circuits 75 and 77 which sample the distance pulses provided by transducer 71, and extend the distance pulses provided during sampling periods to a distance counter 79 and to a speed counter 80.

The distance pulses provided by transducer 71 are extended to gate 77, over an input circuit 82 including an amplifier circuit 83 and a frequency control circuit 84. The frequency control circuit 84 includes a frequency doubler circuit **84*a* and a frequency divider circuit 84*b* which increase or decrease the frequency of the distance pulses, permitting the control circuits 68** to be adapted to a wide range of vehicle engine speed ratios.

The gate circuit 77 is enabled by the sampling circuit 76 to define a sampling duration. The period of the sampling rate is determined by outputs of a time base generator 90 which supplies timing pulses to the timer circuit 74 over gate circuit 75. The time base generator circuit 90, which includes a crystal oscillator 91 and a pulse divider circuit 92, is continuously operable to provide clock pulses at a given rate and at multiples of such given rate.

Clock pulses provided by the time base generator 90 are extended over a drive circuit 95 to the clock drive stepping motor 42 which drives the clock 16 and the chart plate 31 of the chart recording apparatus. Further clock pulses are extended over gate circuit 75 to periodically enable the sampling circuit 76 which enables gate 77 for a predetermined sampling duration during which time the distance pulses extended over input circuit 82 to the gate circuit 77, are extended to distance counter 79 and speed counter 80. The distance counter 79 provides control pulses to a motor drive circuit 96 for the odometer stepping motor 40 which effects stepping of the odometer apparatus 14 for indicating the distance travelled, and movement of the odometer stylus 36 on the recording chart 33.

The distance pulses extended to the speed counter 80 are directly representative of the speed of the vehicle. That is, the sampling period is selected such that the number of pulses extended to the speed counter 80 during each sampling period is indicative of the speed of the vehicle in units of distance, such as miles (or kilometers) per hour.

The output of the speed counter 80 is extended to a latch circuit 85 is response to a latch pulse provided by a gate 75 at the end of each sampling period at which time the speed counter 80 is reset. The outputs of the latch circuit 85 are extended in inputs of a comparator circuit 86 and compared with outputs of a photo encoder apparatus 87 representative of the current position of the speed shaft 17. The comparator circuit 86 provides a command output to a motor drive circuit 97 for the speedometer stepping motor 44 to effect the repositioning of the speed shaft 17 and movement of the speed stylus to indicate the current speed of the vehicle. When the vehicle is travelling at a constant speed, the outputs of the latch circuit 85 are identical to the outputs of the photo encoder 87 and no change is effected in the position of the speed shaft 17 and the speed stylus 38. In the event of an increase or decrease in vehicle speed, the comparator circuit 87 provides a suitable command to the speedometer stepping motor 44 to effect forward or reverse positioning of the speed shaft 17 and a corresponding change in the position of the speed stylus 38 to reflect the change in speed.

An idler circuit 78 is provided to effect the recording on the chart 33 of an indication of idling time for the vehicle. Whenever the vehicle is idling, no distance pulses are supplied to the speed counter 80, and accordingly, the speed counter 80 is maintained at a count of zero. The idler circuit 78 samples the output of the speed counter 80 under the control of timing pulses supplied over gate 75, and idler circuit 78 provides an input to the latch circuit 85 whenever output of speed counter 80 is zero, representative of a preselected speed.

The input supplied to the latch circuit 85, which in the illustrative embodiment, represents 2 miles per hour, enables latch circuit 85 to output a signal which controls the comparator circuit 86 to provide an output to the speed motor drive 97 to effect periodic movement of the speed stylus 38. Accordingly, a wide line indicated at 33d (FIG. 2A), is marked in the chart 33, to indicate a idling condition for the vehicle. Referring again to FIG. 4, the homing switch 63 also provides an input to the speed counter 80 to permit homing of the speed shaft 17 whenever the cover 26 is opened and reclosed.

DETAILED DESCRIPTION

Input Transducer

Figure 5:
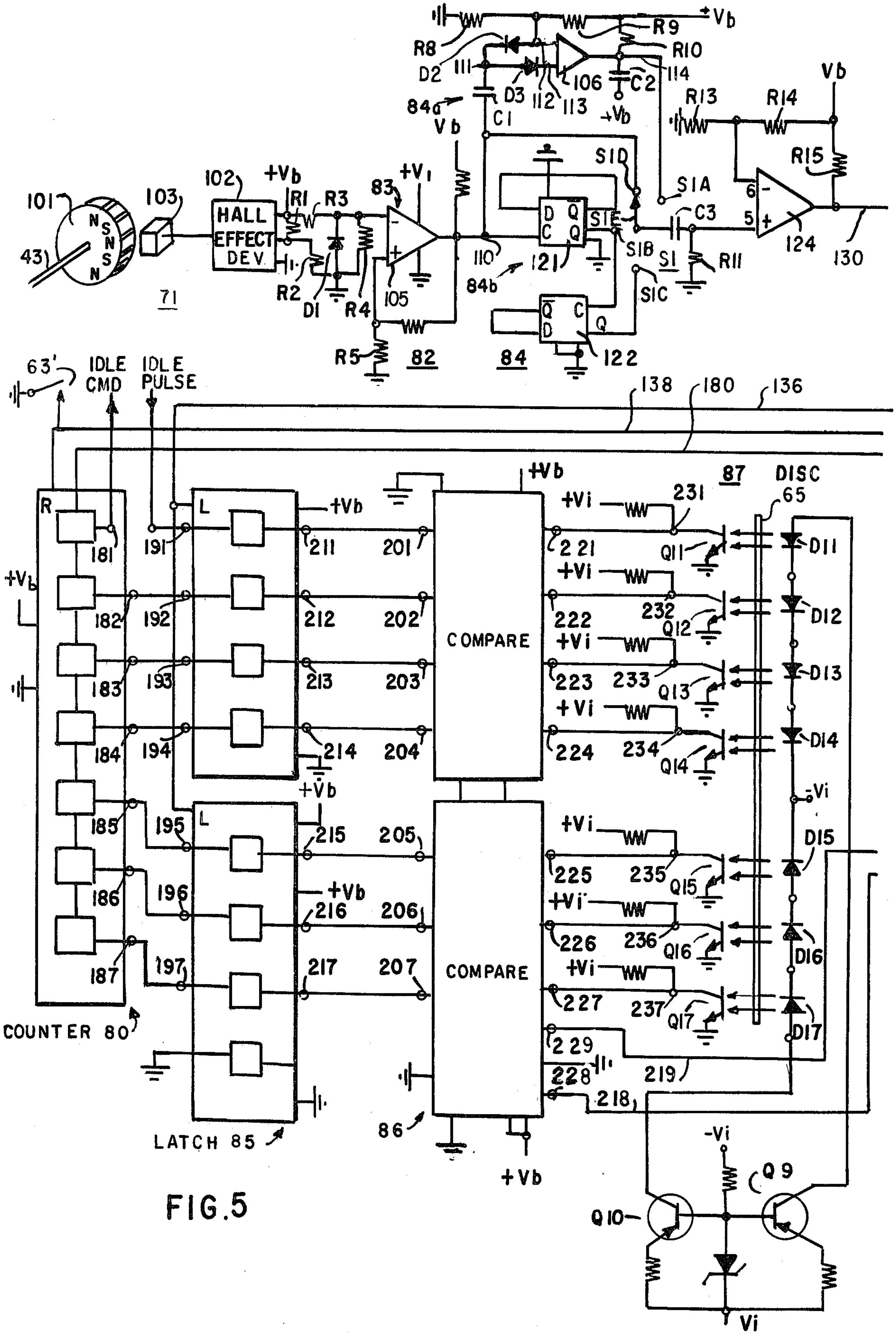
FIGS. 5–7 when arranged as shown in FIG. 11 are a schematic circuit and partial block diagram for the control circuits shown in FIG. 4.
Figure 6:
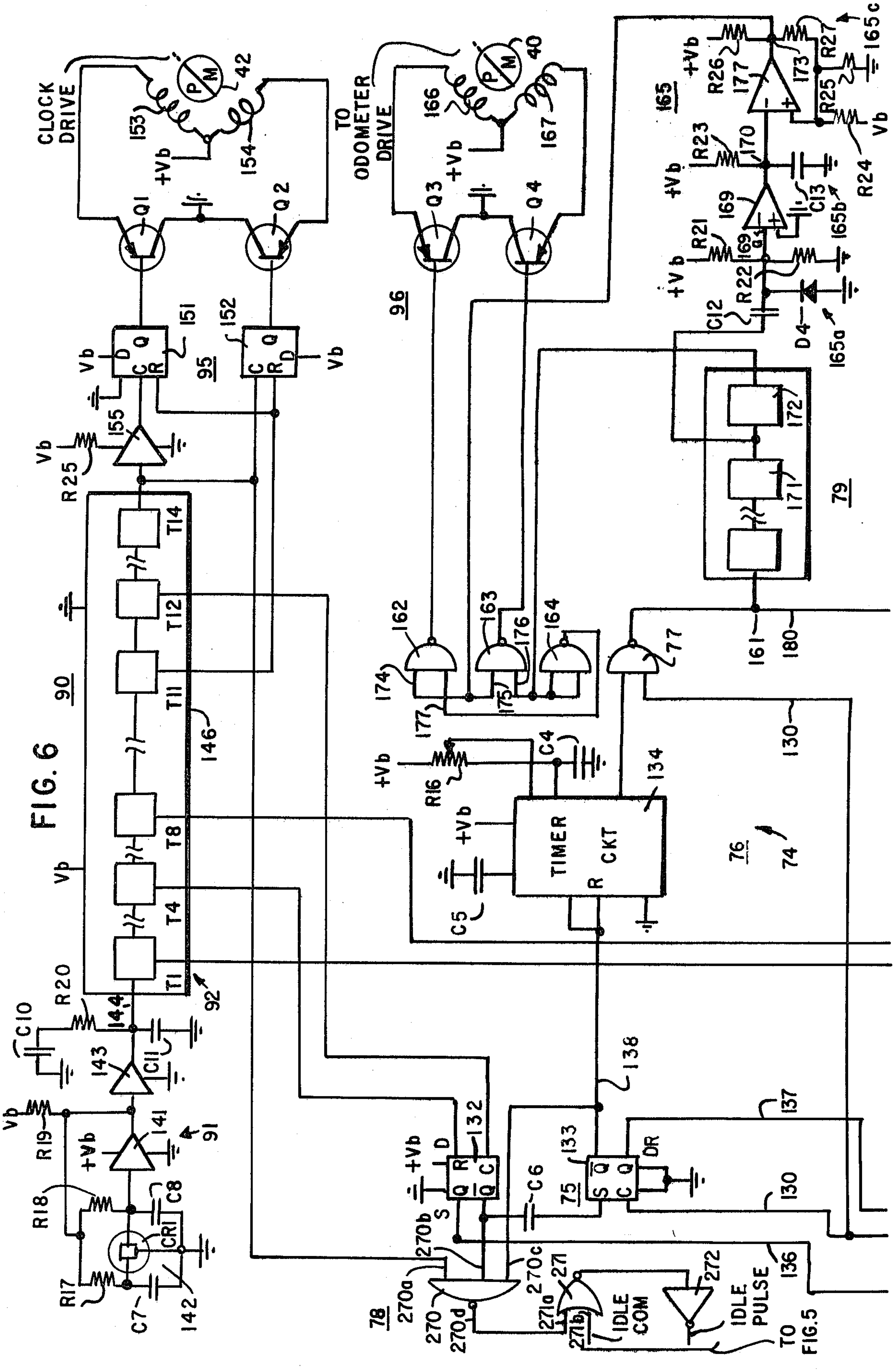
Figures 7, 7A:
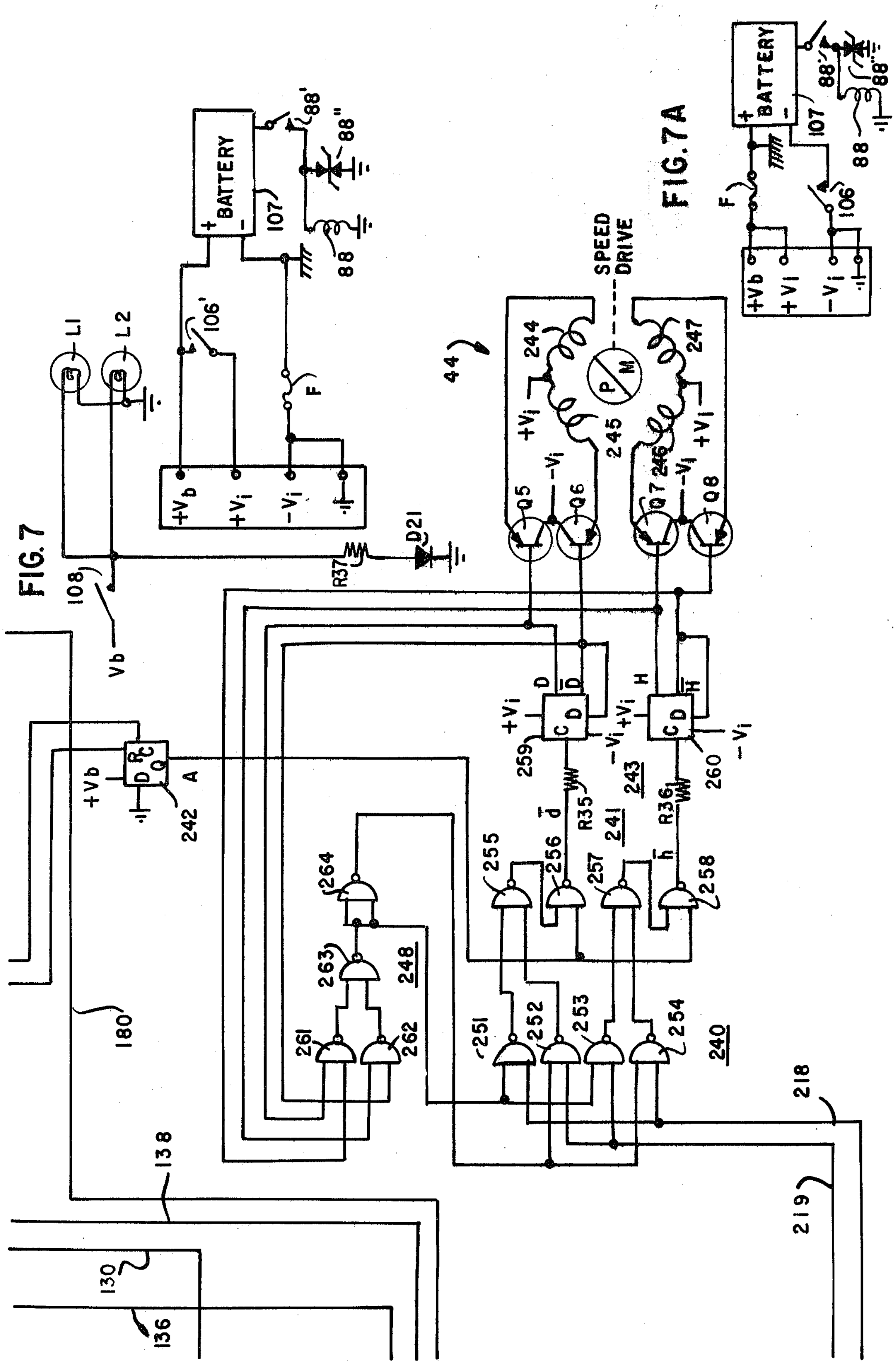
FIG. 7A illustrates the manner of connection of the control circuits of FIGS. 4–7 to a battery source for a vehicle having a positive ground system.

FIGS. 5–7, when assembled as shown in FIG. 11 provide a schematic circuit and partial block diagram for the control circuits 68 of the tachograph unit 10. Referring to FIG. 5, the input transducer 71 includes a rotatable magnetic disc element 101 and a Hall effect sensing device 102, which may be the Type X-636 5955, commercially available from Microswitch, a Division of Honeywell, Inc. The disc element 101 is coupled to the speed drive of the vehicle by way of a cable 45 and drive pin 43 and is rotated at a speed determined by the motor drive. The disc element 101 has permanent magnets defining north and south poles alternately disposed along the periphery of the disc 101.

As the disc rotates relative to the sensor 103, an input is supplied to the Hall effect device 102 with each reversal of magnetic polarity enabling the device 102 to provide a pulse output. In the exemplary embodiment wherein the disc 101 has 15 north poles and 15 south poles, fifteen polarity reversals, or field variations, are provided for each complete revolution of the disc 101, and thus the Hall effect device 102 provides fifteen output (or distance) pulses for each revolution of the disc 101. Assuming an engine speed of 1000 rev/mile when the vehicle is travelling at a speed of 60 miles per hour, the Hall effect device 102 provides 15,000 pulses per minute or 250 pulses per second.

In accordance with the exemplary embodiment, power at level +V*b* is supplied to the Hall effect device 102, as well as to the electronic circuits of control circuits 68, such as the time base generating circuit 90, the clock drive circuits, the counters 79 and 80, directly from the vehicle battery 107 over terminals +V*b*, which is connected to the positive battery terminal, and terminal −V*i*, which serves as ground and is connected over a fuse F to the negative battery terminal, so that the electronic circuits of the control circuits 68 are continuously powered. The photo encoder 87 and the speed motor 44 are connected to power at a terminal ⇄V*i* which is connected to the positive battery terminal over the ignition key switch 106, as shown in FIG. 7 (or oil switch or relay for diesel powered vehicles), and thus are energized only when the vehicle is in operation. The connections shown in FIG. 7 are exemplary of the manner of connection to a vehicle having a negative ground system in which the negative terminal of the battery 107 is connected to vehicle chassis.

For a vehicle having a positive ground system in which the positive battery terminal is connected to the vehicle chassis, terminal +V*b* and +V*i* are connected over fuse F to the positive battery terminal and terminal −V*i* is connected over switch 106 to the negative battery terminal.

Input Circuits

The distance pulses provided at the output of the Hall effect device 102 are extended to the frequency control circuit 84 over the amplifier circuit 83. The input amplifier 83 comprises a Motorola Type MC3302 Operational Amplifier 105 which serves to provide impedance isolation between the input sensor 71 and the rest of the control circuits 68.

The frequency doubler circuit **84*a* of the frequency control circuit 84 comprises an operational amplifier 106, such as the Motorola Type MC3302. The amplifier 106 has a first input 112 connected over a diode D2 and a capacitor C1 to the output of amplifier 105 at point 110 and over a resistor R8 to ground. A further diode D3 is connected from the junction 111 of diode D2 and capacitor C1 to a second input 113. The output of amplifier 106 at point 114** is connected over a resistor R10 to +V*b* and over a resistor R9 to input 112 which bias the amplifier 106 to be normally on. A capacitor C2 is connected between the amplifier output 114 and +V*b*.

Capacitor C1 differentiates each distance pulse providing positive and negative going pulses at point 111, in response to the leading and trailing edges, respectively, of each distance pulse. The positive and negative pulses provided at point 111 are extended over respective diodes D3 and D2 to inputs 113 and 112 of the amplifier 106, which is turned off by each pulse such that pulses are provided at the output 114 of the amplifier 106 which are twice the frequency of the distance pulses provided by the input transducer 71.

The output 114 of the frequency doubler circuit **84*a* is connected to a terminal S1A of a four-position switch S1 which permits selection of a frequency doubling operation when switch arm S1E is positioned to engage terminal S1A. Frequency doubling is employed when the tachograph unit 10 is used in a vehicle having an engine speed ration below 1000 rev/mile and serves to double the frequency rate of the distance pulses provided by the input sensor 71**.

The frequency divider circuit **84*b* includes a pair of data latch circuits 121 and 122, such as the RCA Type CD4013A. Data latch 121, which provides a divide by two functions, has its clock input connected to the output 110 of input amplifier 105, and its true output Q connected to a terminal S1B of switch S1. Data latch 122, which is controlled by the output of data latch 121 to provide a divide by four function, has its clock input connected to the true output of Q of data latch 121, and its true output Q connected to terminal S1C of switch S1. The switch S1 has a further terminal S1D connected directly to the output 110 of input amplifier 105**.

The switch S1, shown with switch arm S1E engaging terminal S1D, provides a bypass over the frequency control circuits 84. A divide by two or a divide by four operation is provided with the switch arm S1E is positioned to engage terminal S1B or S1C, such mode being used when the engine speed ratio is greater than 2000 rev/mile.

The output of the frequency control circuit 84 at switch arm S1E of switch S1 is coupled to a one-shot circuit comprised of a capacitor C3 and amplifier 124 which provides a pulse output of a short duration for each distance pulse input supplied thereto. The pulse width, which is 150 microseconds in the illustrative embodiment, is determined by the values of capacitor C3 and a resistor R11 which is connected between an input of the amplifier 124 at pin 5 and ground. A reference threshold is established for amplifier 124 by resistors R13–R14. The output of amplifier 124 is connected over a conductor 130 to an input of gate circuit 77 shown in FIG. 6.

Adjustable Timer

Referring to FIG. 6, the adjustable timing circuit 74 includes gate circuit 75 which is comprised of a pair of data latch circuits 132 and 133, such as the RCA Type CD4013A, and the sampling circuit 76 which includes a Signetics Type SE555V Timer Circuit 134, and associated timing elements including variable resistor R16 and capacitor C4, connected for operation as a one-shot circuit. The distance pulses extended to the gate 77 are gated to the distance counter 79 and to the speed counter 80 (FIG. 5) whenever gate 77 is enabled by the sampling circuit 76.

The data latch 132 has a clock input connected to an output T12 of pulse divider circuit 92 of the time base generator 90, which provides timing pulses at a 4HZ rate, and a reset input connected to an output T4 of the divider circuit 92 which provides timing pulses at a 1024 HZ rate. The data input of the latch 132 is connected to +V*b*, enabling the latch 132 to be set and reset at a 4HZ rate which defines the sampling rate of 0.25 seconds, to provide a 488 microsecond latch pulse to the latch circuit 85 (FIG. 5) over conductor 136, which is connected to the true output Q of latch 132, and a set pulse for latch 133 which is coupled over a capacitor C6 to the set input of latch 133. Latch 133, which has its clock input connected to conductor 130 to receive distance pulses and its data connected to ground, responds to the set pulse provided by latch 132 to provide a reset pulse of a length determined by the next occurrence of a distance pulse on conductor 130 to the speed counter 80 over conductor 137 which is connected to the true output Q of the latch 133, and a set pulse for the timer circuit 134 over conductor 138, which is connected to a reset input of the timer circuit 134. The timer circuit 134 provides a pulse output of a predetermined pulse width, which defines the duration of the sampling period. The pulse width is established by the values of a resistor R16 and a capacitor C4 which are connected between timing inputs of the timer circuit 134. In the exemplary embodiment, the duration of a sampling period is selected to maintain gate 77 enabled to pass 14,000 pulses per mile travelled by the vehicle. Typically 0.24 seconds for a drive ratio of 1000 rev/-mile.

Time Base Generator

Referring to FIG. 6, the time base generator 90, which provides timing pulses for the control circuits 68, includes the crystal oscillator 91 which is comprised of an amplifier 141 and a timing network 142, which supplies a frequency signal to the amplifier 141. The timing network 142 includes a crystal CR1 and associated timing resistors R17 and R18 and capacitors C7 and C8 which determine the output frequency for the oscillator 91, which in the exemplary embodiment is 16.384KHz. The output of amplifier 141 is extended over a buffer amplifier 143 to an input 144 of the pulse divider circuit 92. Amplifiers 141 and 143 may be the RCA Type CD4007 Inverter Amplifier. The oscillator 91 and the pulse divider circuit 92 receives power directly from the vehicle battery 107.

The pulse divider circuit 92 comprises an RCA Type CD4020 Ripple Counter 146 which receives the frequency output of the oscillator 91 at input 144 thereof and divides the frequency output to provide timing pulses provided at frequencies of 1.02KHz and 4Hz at respective outputs T4 and T12, which are used to control the timer circuit 74. The counter provides timing pulses at frequencies of 8.192KHz and 64Hz at respective outputs T1 and T8 which control the speedometer drive circuits 97, and the counter provides timing pulses at frequencies of 8Hz and 1Hz at respective outputs T11 and T14 for controlling the clock drive circuits 95.

Clock Drive Circuits

The clock drive circuits 95 include a pair of data latch circuits 151 and 152, such as the RCA Type CD4013, which respond to the timing pulses provided by the counter 146 to control the conductivity of a pair of driving transistors Q1 and Q2 which in turn control the energization of windings 153 and 154 of the clock stepping motor 42.

Data latch 152 has its data input connected to the battery 107 and its clock input connected to output T14 of the counter 146 to receive timing pulses at a 1Hz rate for setting latch 152. The latch 152 has its reset input connected to output T11 of the counter 146 to receive timing pulses at an 8Hz rate for resetting the latch 152 such that the latch 152 is set and reset once during each second period.

Similarly, data latch circuit 151 has its data input connected to the battery 107 and receives clock pulses at a 1Hz rate over an inverter 155 from output T14 of the counter 146. The reset input of latch 151 is connected to output T11 of the counter 146, enabling latch 151 to be set and reset once during each 1 second period, but delayed ½ second from the setting and resetting of latch 152.

The output of latch 151 is connected to the base of transistor Q1 and the output of latch 152 is connected to the base of transistor Q2. Transistor Q1 controls the energization of winding 153 which is connected between +V*b* and the emitter of transistor Q1 which has its collector connected to ground. Transistor Q2 controls the energization of winding 154 which is connected between V*b* and the emitter of transistor Q2 which has its collector connected to ground.

Accordingly, as latches 151 and 152 are set and reset, the clock drive motor 42 is stepped at a rate of one step per second. By way of example, the clock stepping motor 42 may be the Type M1 HSI 33501 stepping motor which advances 6° per step so that one complete revolution takes 1 minute permitting drive through a suitable 60:1 gear reduction of the minute hand 23 of the clock 16 and driving of the hour hand 22 through suitable 12:1 gear reduction from the shaft of the minute hand. In addition, the rotational output of the hour hand is reduced 2:1 to provide drive for the recording chart plate 31.

Odometer Drive Circuits

The odometer drive circuits 96 and the distance counter 79 are shown in FIG. 6. The distance counter 79 comprises a six stage binary counter, such as the RCA Type CD4024 which has an input 161 connected to the output of gate 77 to receive the distance pulses gated over gate 77 whenever the gate 77 is enabled by the timer circuit 76. The drive circuits 96 include steering gates comprised of NAND gates 162–164, and a one-shot circuit 165 which respond to outputs of the counter 79 to operate as a two phase clock providing pulses which control the conductivity of a pair of drive transistors Q3 and Q4 which in turn control the energization of windings 166 and 167 of the odometer stepping motor 40.

The output of the sixth stage 172 of the counter 79 is connected to an input 176 of gate 163 and to input 177 of gate 162 over gate 164, which serves as an inverter, to provide an output to gates 162 and 163 for each 64 pulses counted by the counter 79. Second inputs 174 and 175 of respective gates 162 and 163 are commonly connected to the output of the one-shot circuit 165 at point 173 which provides a 45 millisecond strobe pulse for the gates 162 and 163 for every 32 pulses counted by the counter 79.

The one-shot circuit 165 includes a differentiating circuit 165a including capacitor C12, a diode D4, resistors R21 and R22, and an operational amplifier 169, a timing network **165*b* comprised of resistor R23 and a capacitor C13, and an amplifier stage 165*c* comprised of an operatonal amplifier 177 and resistors R24–R27. Amplifiers 169 and 177** may each comprise a single stage of a Motorola Type MC3302 Operational Amplifier.

Capacitor C12 is connected between the output of counter stage 171 and the inverting input of the amplifier 169, which is also connected to V*b* over resistor R21 and to ground over resistor R22. Resistors R21 and R22 form a voltage divider which provides a potential at input **169*a* maintaining amplifier 169 normally off. The diode D4 has its anode connected to ground and its cathode connected to the inverting input and clamps such input at ground for positive going signals. The non-inverting input of amplifier 169** is connected to ground.

The output of amplifier 169 is connected to point 170 which is connected to V*b* over resistor R23, to groung over capacitor C13, and to an inverting input of amplifier 177. Amplifier 177 has a non-inverting input connected to V*b* over resistor R24 which enables amplifier 177 to be maintained normally on. The output of amplifier 177 is connected over resistor R26 to V*b*, and over voltage divider resistors R27 and R25 to ground, which provide a positive level at the output of amplifier 177 at point 173 whenever amplifier 177 is off. The amplifier output 173 is connected to inputs 174 and 175 of respective gates 162 and 163.

In operation, the pulse output provided by the counter stage 171 is differentiated by the differentiating circuit **165*a* providing a pulse which turns on amplifier 169 momentarily, enabling capacitor C13 to discharge over the amplifier 169, lowering the potential at point 170, causing amplifier 177 to turn off. Upon termination of the pulse, amplifier 169 turns off, and capacitor C13 charges, at a rate determined by the values of capacitor C13 and resistor R23, selected to provide a 45 millisecond time for which amplifier 177 remains off. As capacitor C13 charges, the potential at point 170 increases, and when the enabling threshold for amplifier 177 is reached, the amplifier turns on and disables gates 162 and 163**.

The output of gate 162 is connected to the base of transistor Q3 and the output of gate 163 is connected to the base of transistor Q4. Transistor Q3 controls the energization of winding 166 which is connected between +V*b* and the emitter of transistor Q3 which has its collector connected to ground. Transistor Q4 controls the energization of winding of 167 which is connected between +V*b* and the emitter of transistor Q4 which has its collector connected to ground.

As indicated above, the sampling circuit 74 enables the gate 77 to be enabled so as to pass 14,400 pulses for each mile driven by the vehicle. The six-stage counter 79 provides 225 pulses per mile which enables gates 162 and 163 to be enabled alternately 225 times for each mile travelled. In the exemplary embodiment, the odometer stepping motor 40, which may be the Type HSI 35202, advances 2.25° per step so that the tenths dial of the odometer indicator 20 is rotated one revolution for each mile driven by the vehicle.

Although the distance counter 79 is described as being responsive to a predetermined number of distance pulses provided by the sampling circuit 76, and thus is operable in synchronism with the system clock 96, it is apparent that with suitable modification of the counter 79, the distance pulses provided at the input of gate 77 may be supplied directly to the distance counter such that the odometer drive operates asynchronously relative to the system clock.

Speed Counter and Latch Circuits

Referring to FIG. 5, the speed counter 80 comprises a seven stage counter such as the RCA Type CD4024 Binary Counter. The pulse input of the counter 80 is connected over conductor 180 to the output of gate 77 (FIG. 6) to receive the distance pulses extended to the output of gate 77 when gate 77 is enabled by the sampling circuit 74. The duration of the sampling period is selected so that each pulse extended to the counter 80 represents 1 mile per hour, and the counter 80 counts pulses extended thereto during each sampling period while gate 77 is enabled such that at the end of the sampling period the number of pulses counted corresponds to the speed of the vehicle in units of miles per hour.

The homing switch 63, illustrated as a normally open switch 63' in FIG. 5, is also connected between ground and the pulse input of the counter 80 and is operable to connect a ground to the pulse input of counter 80 whenever the cover 26 is opened and then reclosed.

The counter 80 is updated during each sampling period and provides binary coded signals at outputs 181–187 thereof which represent the coding for the number of pulses counted for a given sampling period. The counter 80 is reset at the start of each sampling period by the reset signal extended thereto over conductor 138 by latch circuit 133.

The outputs 182–187 of the counter 80 are extended to respective inputs 192–197 of the latch circuit 85 which may comprise two RCA Type CD4024A Four Stage Latch Circuits, only seven stages of which are used in the present embodiment. The outputs of the counter are strobed into the latch circuits by the 488 microsecond strobe pulse provided by latch circuit 132 (FIG. 6). A further output 181 of counter 80 is extended to the idler circuit 78 (FIG. 6) the output of which is connected to a further input 191 of the latch circuit 85.

Comparator and Encoder Circuits

The comparator circuit 86, which may comprise two Motorola Type MC14585 Four Bit Comparator Circuits, has a first set of inputs 201–207 connected to outputs 211–217 of the latch circuit 85, and a second set of inputs 221–227 connected to outputs 231–237 of the encoder circuit 87, which provides a seven bit word representing the coding for the angular position of the speed shaft 39.

The encoder circuit 87 includes seven light emitting diodes C11–D17, such as the type ME-60 which direct light through a code disc 55 toward corresponding light detectors, embodied as seven photo transistors Q11–Q17, such as the type MRD-150. Diodes D11–D14 are serially connected in the collector circuit of a drive transistor Q9 which supplies current to the diodes D11–D14 from source +V*i*. Similarly, transistor Q10 supplies current to diodes D15–D17 which are serially connected in the collector circuit of transistor Q10.

Each of the photo transistors, such as transistor Q11 has its photo sensitive area disposed adjacent the code disc 55 has its collector emitter circuit connected between +V*i* and ground. The outputs of the encoder circuit 87 is taken from the collectors of transistors Q11–Q17, which comprise outputs 231–237 of the encoder circuit 87, are connected to inputs 221–227 of the comparator circuit 86.

The code disc 55 is carried by the speed shaft 39, as shown in FIG. 3, which is disposed between printed circuit board 58, which carries the light emitting diodes D11–D17 and the printed circuit board 53 which carries the photo transistors Q11–Q17. Referring to FIG. 8, in an illustrative embodiment the code disc 55 includes a plastic substrate 188 on which is disposed an opaque film 189 which is selectively inscribed with clear arcuate areas 190 of different lengths, disposed in seven concentric rings or tracks which define the code pattern. The clear and opaque areas may be produced on the plastic substrate 188 photographically.

As the code disc 55 rotates with the speed shaft 39, such rotation causes the clear areas in the seven tracks to vary light conduction between the light emitting diodes D11–D17 and the photo transistors Q11–Q17, permitting different combinations of the transistors Q11–Q17 to be rendered conductive for different angular positions of the speed shaft 37. The code disc provides coding for 80 shaft positions and the output binary words provided by the encoder for each of the positions are identical with the codings for the count of the speed counter 80 for speeds from zero to 80 miles per hour.

Referring again to FIG. 5, whenever the inputs to the comparator circuit 86 fail to compare, the comparator circuit 86 provides a drive forward or drive reverse command signal at respective outputs 228 and 229 thereof which are extended over conductors 218 and 219 to the speed motor drive circuits 97, shown in FIG. 7, to effect a correction in the position of the speed shaft 39.

Speed Drive Circuits

Referring to FIG. 7, the speed motor drive circuits include steering gates 240, including four two-input NAND gates 251–254, which extend the drive forward and drive reverse signals provided by the comparator circuit 86 to clock gates 241, including four two-input NAND gates 255–258, which extend timing pulses provided by a latch circuit 242 under the control of timing pulses from the time base generator 90 to memory latch circuits 243. The memory latch circuits 243, which store each command until a subsequent command is received, control the enabling of drive transistors Q5–Q8 which in turn control the energization of the four windings 244–247 of the reversible stepping motor 44, such as the Series 82000 Four Phase Logic Drive Motor, commercially available from A. W. Hayden Co., which drives the speed shaft 37 and the speed stylus 38. The memory latch circuits 243 also enable motor phase signal gates 248, including four two-input NAND gates 261–264, which provide enabling signals to the steering gates 240 which indicate the phase or direction of the previous correction for the speed shaft 39.

The memory latch circuits 243 comprise a pair of data latch circuits 259–260, which may be the RCA Type CD4013. Latch 259 controls the enabling of transistors Q5 and Q6, and latch 260 controls the enabling of transistors Q7 and Q8. The true output of latch 259 at point $\bar{D}$ is conneced to the base of transistor Q5, and the false output of latch 259 at point D is connected to the base of transistor Q6 and to the data input of the latch 259. Similarly, the true output of latch 260 at $\bar{H}$ is conncted to the base of transistor Q7, and the false output of the latch 260 at point H is connected to the base of transistor Q8 and to the data input of the latch 260.

Transistors Q5 and Q6 control the energization of respective windings 244 and 245 of the stepping motor 44, which are connected between +V*i* and the emitters of corresponding transistors Q5 and Q6 which have their collectors connected to ground.

Transistors Q7 and Q8 control the energization of respective windings 246 and 247 which are connected between +V*i* and the emitters of respective transistors Q7 and Q8 which have their collectors connected to ground.

Latch circuits 259 and 260 are set and reset in response to clock pulses provided over latch 242 and extended to the clock inputs of the latch circuits 259 and 260 over respective clock gates 256 and 258. The clock pulses are derived from timing signals provided at outputs T1 and T8 of the counter 146, which are extended to the reset and clock inputs of latch 242. Timing pulses at the 64 Hz rate set the latch 242 which is then reset by the next timing pulse at the 8.192KHz rate, providing clock pulses at a 64 Hz rate.

Steering gates 240 are enabled by outputs of the motor phase signal circuits 248 and signals provided on either the drive forward lead 218 or on the drive reverse lead 219. Gates 261 and 262 of the motor phase signal gates 248 logically combine the signal outputs of latch circuits 259 and 260, providing a steering signal over gate 263 to inputs of gates 251 and 253 of the steering gates 240 and a steering signal over an inverter 264 to steering gates 252 and 254. The drive forward signal extended over lead 218 enables either gate 251 or gate 254 depending on the state of the memory latches 259 and 260. The drive reverse, extended over lead 219, enables either gate 252 or gate 253 in accordance with the states of memory latches 259 and 260.

The memory latches 259 and 260 provide four control conditions, that is, with latch 259 being set, latch 260 can be set or reset, and with latch 259 being reset, latch 260 can be set or reset. Such conditions permit the drive transistors Q5–Q8 to be enabled in four sets of pairs to effect either forward (clockwise) or reverse (counter clockwise) rotation of the motor shaft.

The true output of latch 259 at point D and the false output of latch 260 at point $\overline{H}$ are extended to the inputs of gate 261, and the false output of latch 259 at point $\overline{D}$ and the true output of latch 260 at point H are extended to the inputs of gate 262. The outputs of gates 261 and 262 are extended to inputs of gates 263. Gates 261 and 262 are selectively enabled in accordance with the state of memory latches 259 and 260 to provide steering signals over gates 263 and 264 to the steering gates 251–254.

Steering gates 251–254, as enabled by the motor phase signal gates 248, are responsive to the drive forward signal or the drive reverse signal provided over respective leads 218 and 219 to gate the clock signals provided by latch 242 to the clock input of the memory latches 259 and 260 to effect the desired energization of motor windings 244–247.

Idler Circuit

Referring to FIG. 6, the idler circuit 78 includes gates 270 and 271, and an inverter 272. Gate 270 has an input 270*a* connected to output T14 of the pulse divider circuit 92 to receive timing pulses at a IHz rate. Gate 270 has further inputs 270*b* and 270*c* connected to the false outputs of respective data latch circuits 132 and 133.

The output 270*d* of gate 270 is connected to one input 271*a* of gate 271 which receives an IDLE COMMAND Signal, provided at output 181 of speed counter 80 over a second input 271*b* of the gate 271. The output of gate 271 is connected over inverter 272 to the input 191 of the latch circuit 85 to extend a signal IDLE Pulse thereto.

The timing pulses provided to gate 270 enable the gate 270 at a ¼ second rate which provides an enabling signal to input 271*a* of gate 271. Gate 271 samples the output of the speed counter 80 and extends the output the first stage of the counter 80, represented by the signal IDLE COMMAND, to input 191 of the latch circuit 85 whenever the vehicle is moving.

Whenever the vehicle is stopped and the ignition is on, then after a one-fourth second interval, gate 270 detects the lack of a set pulse from latch 133 since no distance pulses are provided to latch 133 over conductor 130, and enables timing pulses from gate 270 to be extended over inverter 272 to the latch circuit 85 which results in the application of drive pulses to the speed stepping motor 44 causing marking of a speed indication on the chart 33 (FIG. 2A) in the area 33*d* representative of zero to two miles per hour. Each second, the speed stylus 38 is moved once each second inscribing the wide line on the chart 33 as indicated at 33d in FIG. 2A.

Homing Switch

In the event the cover 26 is opened while the vehicle is moving, say at 50 mph, the speed drive is disengaged from the speed shaft 17 and the spring loaded speed indicator 19 is returned to zero. However, the speed counter 80 continues to register a count of 50 in response to distance pulses supplied thereto during each sampling period so that the speed shaft is maintained at an angular position indicative of 50 mph.

Upon reclosure of the cover 26, the homing switch 63 is operated, providing ground to the input of the speed counter 80 permitting the speed counter 80 to reset to zero. Accordingly, the outputs of the speed counter 80 as extended to the comparator 86 over the latch circuit 85 enable the comparator circuit 86 to provide suitable command signals to the motor drive circuit 97 to effect rotation of the speed shaft to an angular position indicative of zero mph.

Operation

Referring to FIG. 6, the time base generating circuits 90 are energized directly from the battery 107 of the vehicle, and accordingly are continuously operable to provide timing pulses for effecting the operation of the clock 16 and rotation of the recording chart drive plate 31. The 16.384KHz signal provided by the crystal oscillator 91 is extended to the counter 146 which provides timing pulses including pulses at a 1Hz rate at output T14 and pulses at an 8Hz rate at output T11, which are extended to latch circuits 151 and 152 which functions as a two-phase clock with latch 151 and latch 152 being alternately set and reset once during each 1 second period.

When latch 151 is set, transistor Q1 is enabled, energizing winding 153 of the clock drive motor 42. When latch 152 is set ½ second later, transistor Q12 is enabled to energize winding 154 of the motor 42. As windings 153 and 154 are alternately energized, the shaft of the motor 42 is driven one complete revolution per minute and the rotation is coupled through suitable reduction gearing to the minute hand 23 of the clock 18 (FIG. 1) and through suitable reduction gearing to the hour hand 22 of the clock 18. In addition, the chart drive plate 31 is rotated past the odometer stylus 36, the event stylus 37 and the speed stylus 38 at a rate which provides one complete rotation of the chart in a given 24 hour period.

Referring to FIG. 5, assuming that the vehicle is travelling at a speed of 60MPH, and has an engine speed ratio which causes the magnetic disc element 101 to be rotated at the rate of 1000 revolutions per mile, then, as the north and south poles are rotated past the sensor 103, providing 15 magnetic field reversals per revolution, the Hall effect device 102 provides 15,000 pulses for each mile driven, and for a speed of 60 MPH, provides 250 pulses per second. The distance pulses are extended over the input amplifier 83 and the frequency control circuit 84, which is shown to be bypassed by setting switch arm S1E to engage terminal S1D, to the one-shot circuit 124. Accordingly, the one-shot circuit 124 receives 250 pulses each second and provides a corresponding number of pulses of 150 microseconds duration which are extended over conductor 130 to gate 77 (FIG. 6).

Referring to FIG. 6, the sampling circuit enables gate 77 at the sampling rate of 0.25 seconds to pass distance pulses to the distance counter 79 and to the speed counter 80. At the start of each sampling period, latch 132 is set in response to the leading edge of the 4Hz pulse, (FIG. 9, line II) provided at output T12 of counter 146, and is reset by the leading edge of the next 1.024 KHz pulse (FIG. 9, line I) provided at output T4 of the counter 146.

When latch 132 is set, a 488 microsecond latch pulse (FIG. 9, line III) is provided at the true output Q of the latch 132 and extended over lead 136 to the load input of the latch circuit 85 (FIG. 5) for loading the output word provided by the speed counter 80, assumed to represent a count of 60, which was obtained during the previous sampling period, into the larch circuit 85.

In addition, when the latch 132 is reset, the trailing edge of the pulses, (FIG. 9, line IV) provided at the output $\overline{Q}$ of latch 132 is coupled over the capacitor C6, providing a positive pulse which sets latch 133. When the latch 133 is set, a positive pulses, (FIG. 9, line V) provided at the true output Q of the latch 133 is extended over conductor 138 to the reset input of the speed counter 80, resetting the counter 80, and the negative going pulse (FIG. 9, line VI) at the false output Q of the latch 133 enables the timer 134. Latch 133 is reset by the leading edge of the next distance pulse provided on lead 130 (line VIII), thereby terminating the reset signals and enabling the timer circuit 134 and the counter circuit 80.

When enabled, the timer circuit 134 provides an output (FIG. 9, line VII) which enables gate 77 until the time circuit 134 times out. The duration of the sampling period defined by the width of the pulse output of the timer circuit 134 is less than the ¼ second sampling rate, and in the present example is assumed to be adjusted to 0.24 seconds. The duration of the sampling period, is selected so that gate 77 is enabled to pass a number of pulses corresponding to the speed of the vehicle in units of miles per hour. Accordingly, in the present example, the gate 77, passes 60 pulses during the sampling period.

The distance counter 79 acts as a frequency divider and for each mile travelled by the vehicle, gate 77 passes 14,400 pulses per mile to the distance counter 79 which responsively provides 225 pulses per mile to gates 162 and 163 of the odometer drive circuits 96. Gates 162 and 163, which function as a bi-phase clock, provide enabling signals to drive transistors Q3 and Q4. Gages 162 and 163 respond to an output provided by the counter 79, in response to each 64 pulses counted by the counter 79 to enable transistors Q3 and Q4. The one-shot 165 responds to each 32nd pulse counted by counter 79 to enable gates 162 and 163 alternately such that transistors Q3 and Q4 energize windings 166 and 167 alternately whereby the stepping motor 40 rotates the odometer shaft, driving the mileage indicating register 20 (FIG. 1) in accordance with the distance travelled. In the present example, 24 sampling periods are required to increment the odometer register 20 by 0.1 mile. The odometer stylus 36 is also driven relative to the recording chart 33 (FIG. 2) to record the distance travelled by the vehicle on the chart in a format known in the art.

Referring to FIG. 5, the 60 pulses extended over gate 77 during the sampling period are counted by the speed counter 80. At the end of the sampling period, timer circuit 134 times out and disables gate 77 and the number of pulses registered by the counter 80 is 60, which corresponds to the speed of the vehicle in units of miles per hour. At the start of the next sampling period, the outputs of the counter 80 are transferred to the latch circuit 85 and to the inputs 201–207 of the comparator circuit 86, and then the latch control is disabled and counter 80 is reset in preparation for the next sampling cycle.

Assuming the vehicle speed has not changed, the code disc 65 is positioned so that the set of outputs provided by encoder 87 and extended to inputs 221–227 of comparator circuit 85 correspond to the coding for a speed of 60 MPH. Accordingly, since the set of signals supplied to inputs 201–207 correspond to the set of signals supplied to inputs 221–227, the drive forward and drive reverse outputs are both low and no repositioning of the speed shaft 37 is effected.

When the speed of the vehicle increase, the drive forward output 228 of the comparator 86 goes high and this output is extended over the drive forward lead 218 to gates 251 and 254 of the motor drive circuits 97 shown in FIG. 7. One of the gates 251 and 254 is enabled in accordance with the state of the memory latch circuits 259 and 260 by a steering signal provided by the motor phase signal circuits 248.

The stepping sequence for the motor 44 is given in Table I, where D and H correspond to the set conditions for memory latches 259 and 260, respectively.

TABLE I

| Step | D | H | |
|---|---|---|---|
| 1 | 1 | 1 | Rev. |
| 2 | 1 | 0 | ↑ |
| 3 | 0 | 0 | |
| 4 | 0 | 1 | ↓ |
| 1 | 1 | 1 | Fwd. |

Assuming the motor 44 is at step 1, with latches 259 and 260 both set then to effect forward or clockwise rotation of the motor shaft, the motor 44 is energized through steps 2, 3, etc. At step 2, latch 259 is set and latch 260 is reset, and at step 3, both latches 259 and 260 are reset.

To effect reverse or counter-clockwise rotation of the motor shaft, the motor is energized through steps 4, 3, etc. At step 4, latch 259 is reset and latch 260 is set and at step 3, both latches 259 and 260 are reset.

A truth table for the motor drive circuits 97 is given in Table II

TABLE II

| A | F | R | D | H | d | h |
|---|---|---|---|---|---|---|
| 1 | 0 | 0 | 0 | 0 | 0 | 0 |

TABLE II-continued

| A | F | R | D | H | d | h |
|---|---|---|---|---|---|---|
| 1 | 0 | 0 | 0 | 1 | 0 | 0 |
| 1 | 0 | 0 | 1 | 0 | 0 | 0 |
| 1 | 0 | 0 | 1 | 1 | 0 | 0 |
| 1 | 0 | 1 | 0 | 0 | 1 | 0 |
| 1 | 0 | 1 | 0 | 1 | 0 | 1 |
| 1 | 0 | 1 | 1 | 0 | 0 | 1 |
| 1 | 0 | 1 | 1 | 1 | 1 | 0 |
| 1 | 1 | 0 | 0 | 0 | 0 | 1 |
| 1 | 1 | 0 | 0 | 1 | 1 | 0 |
| 1 | 1 | 0 | 1 | 0 | 1 | 0 |
| 1 | 1 | 0 | 1 | 1 | 0 | 1 |

Referring to FIG. 10, assuming the motor 44 is at step 1 and the latches 259 and 260 are both set, providing the outputs shown in lines IV and V, respectively, then the outputs of gates 261 and 262 are high and the output of gate 263 is low, and the output of gate 264 is high. Since at such time both the drive forward and the drive reverse leads 218 and 219 are low, the outputs of gates 251–254 are all high such that gates 255 and 257 disable gates 256 and 258. At such time, transistors Q6 and Q8 are enabled and windings 245 and 247 are energized.

When the drive forward lead 218 goes high (FIG. 10, line II), gate 254 is enabled, disabling gate 257 which enables gate 258 to pass the clock pulses (line I) over lead $\bar{h}$ (line VII) to the clock input of latch 260, resetting the latch 260 as shown in line V of FIG. 10. Accordingly, transistor Q8 is disabled and transistor Q7 is enabled so that winding 246 is energized and winding 247 is deenergized causing the motor 44 to step clockwise.

As the motor 44 is stepped, the speed shaft 39 is rotated, rotating the code disc 55, so that the code word provided by the shaft encoder 87 is changed with each step of the motor 44. The motor control circuits 97 provide drive to the stepping motor 44 until a null condition is detected by the comparator circuit 86 when the inputs supplied by the encoder 87 are identical with the inputs supplied by the speed counter 80 over the latch circuits 85. At such time, the drive forward output 228 goes low and further drive to the motor 44 is inhibited.

Similarly, for a decrease in the speed of the vehicle the comparator circuit 86 provides an output over the drive reverse lead 219 to gates 252 and 253 and one of the gates 252 and 253 is enabled by the motor phase signal circuits 248 in accordance with the state of the memory latch circuits 259 and 260 to effect reverse (counter clockwise) drive for the speed shaft 39, to correct for the difference between the actual speed, as registered by the speed counter 80 and the indicated speed as represented by the code word provided by the encoder circuit 87.

I claim:

1. In an electronic tachograph including recording means for recording at least indications of the distance travelled by a vehicle and the speed of the vehicle, the combination comprising input means for providing distance pulses indicative of the distance travelled by a vehicle, timing means operable to provide timing pulse, first means for deriving from said timing pulses a first output indicative of time, adjustable means resposive to said timing pulses for periodically sampling said distance pulses during sampling periods of a preselected duration to provide a predetermined number of distance pulses at an output thereof during a given sampling period for a predetermined distance of travel by said vehicle, second means responsive to said predetermined pulses for deriving a second output indicative of the speed of said vehicle, and third means responsive to said predetermined pulses to provide a third output indicative of the distance travelled by said vehicle, said recording means being responsive to said first, second and third outputs for recording said indications of distance and speed for said vehicle in relation to time.

2. An electronic tachograph as set forth in claim 1 wherein said recording means includes chart recorder means including a recording chart, time drive means responsive to said first output for driving said recording chart, and speed drive means responsive to said second output for moving a speed stylus on said recording chart to provide a recording representing the speed of said vehicle in relation to time.

3. An electronic tachograph as set forth in claim 2 which includes speed indicator means driven by said speed drive means for providing an indication of the speed of said vehicle.

4. An electronic tachograph as set forth in claim 2 wherein said recording means includes distance drive means responsive to said third output for moving a distance stylus on said recording chart to provide a recording representing the distance travelled by said vehicle in relation to time.

5. An electronic tachograph as set forth in claim 4 which includes distance indicator means driven by said distance drive means for providing an indication of the distance travelled by said vehicle.

6. An electronic tachograph as set forth in claim 2 which includes a clock driven by said time drive means for indicating the time of day.

7. An electronic tachograph as set forth in claim 1 which further includes frequency doubling means connected to said input means to provide distance pulses at twice the frequency of the pulses provided by said input means.

8. An electronic tachograph as set forth in claim 1 which further includes frequency divider means connected to said input means to reduce the number of distance pulses output therefrom.

9. In an electronic tachograph including recording means for recording at least indications of the speed of a vehicle the combination comprising input means for providing distance pulses indicative of the distance travelled by said vehicle, timing means operable to provide timing pulses, first means for deriving from said timing pulses a first output indicative of time, adjustable means responsive to said timing pulses for periodically sampling said distance pulses during sampling periods of a preselected duration to provide a predetermined number of distance pulses at an output thereof during a given sampling period for a predetermined distance of travel by said vehicle, second means responsive to said predetermined pulses for deriving a second output indicative of the speed of said vehicle, said recording means being responsive to said first and second outputs for recording indications of the speed of the vehicle in relation to time.

10. An electronic tachograph as set forth in claim 9 wherein said recording means includes chart recorder means including a recording chart, time drive means responsive to said first output for driving said recording chart, and speed drive means including stepping motor means having a shaft coupled to a speed stylus, and control means responsive to said second output and further ones of said timing pulses to provide drive signals for said stepping motor means for moving said speed stylus on said recording chart to provide a recording representing the speed of said vehicle in relation to time.

11. An electronic tachograph as set forth in claim 10 wherein said stepping motor means comprises a reversible stepping motor and wherein said control means includes means responsive to said second output for providing first outputs to cause said shaft of said stepping motor to be driven in one direction in response to an increase in vehicle speed, and for providing a second output to cause said shaft to be driven in the opposite direction in response to a decrease in vehicle speed.

12. An electronic tachograph as set forth in claim 10 which includes idler means for controlling said speed drive means to effect a recording on said chart of idling time for said vehicle.

13. In an electronic tachograph including recording means for recording at least indications of the distanc travelled by a vehicle the combination comprising input means for providing distance pulses indicative of the distance travelled by a vehicle, timing means operable to provide timing pulses, adjustable means responsive to said timing pulses for periodically sampling said distance pulses during sampling periods of a preselected duration to provide a predetermined number of distance pulses at an output thereof for a predetermined distance of travel by said vehicle, pulse counter means coupled to said output of said adjustable means and responsive to the predetermined number of distance pulses extended thereto during a plurality of successive sampling periods to provide a first output indicative of the distance travelled by said vehicle, distance indicator means responsive to said first output for indicating the distance travelled by the vehicle, and said adjustable means having means for adjusting the number of distance pulses counted by said pulse counter means for a predetermined distance of travel to permit use of the tachograph with vehicles having different numbers of pulses input per unit of distance travelled, said recording means being responsive to said first output for recording said indication of the distance travelled by said vehicle.

14. An electronic tachograph as set forth in claim 13 wherein said recording means includes chart recorder means having a recording chart, chart drive means for driving said recording chart, and distance drive means including stepping motor means having a shaft coupled to a distance stylus and means responsive to said first output for providing drive signals for said stepping motor means for moving a distance stylus on said recording chart to provide a recording representing the distance travelled by said vehicle.

15. An electronic tachograph as set forth in claim 13 wherein said timing means provides a second output indicative of a time reference for controlling said recording means whereby the distance travelled by said vehicle is recorded in relation to said time reference.

16. In an electronic tachograph for use with a vehicle and including recording means for recording at least indications of the speed of the vehicle relative to time the combination comprising input means coupled to a drive of the vehicle for providing distance pulses related to the distance travelled by the vehicle, timing means operable to provide timing pulses, pulse counter means responsive to said timing pulses for counting distance pulses supplied thereto, and adjustable means responsive to said timing pulses for periodically sampling said distance pulses at a rate determined by said timing means and for sampling periods of a preselected duration to provide a predetermined number of distance pulses to said counter means during a given sampling period for a predetermined distance of travel whereby the predetermined number of distance pulses counted by said counter means during a given sampling period corresponds to the speed of the vehicle in units of distance per hour, said recording means being responsive to said counter means and said timing means for recording indications of the speed of said vehicle in relation to time.

17. An electronic tachograph as set forth in claim 16 wherein said adjustable means includes gating means interposed between an output of said input means and an input of said pulse counter means, and sampling means periodically enabled by said timing pulses at a predetermined rate to provide an output signal of a predetermined width which defines a sampling period for enabling said gating means to permit distance pulses to be extended to said pulse counter means during said sampling period, the duration of the sampling period being preselected to permit the number of distance pulses extended to said pulse counter means to correspond to the speed of the vehicle in units of distance per hour.

18. An electronic tachograph as set forth in claim 17 wherein said sampling means includes means for adjusting the width of the output signal to thereby adjust the duration of the sampling period.

19. An electronic tachograph as set forth in claim 17 which includes pulse divider means connected to the output of said gating means and responsive to the predetermined number of distance pulses extended thereto during a plurality of successive sampling periods to provide an output corresponding to the distance travelled by the vehicle, said recording means being responsive to said output of said pulse divider means to record an indication of the distance travelled by said vehicle.

20. An electronic tachograph as set forth in claim 16 wherein said input means includes a Hall effect sensing means and means coupled to the speed drive of the vehicle for effecting a number of magnetic field variations at an input of said input means which is related to the distance travelled by the vehicle.

21. In an electronic tachograph for use with a vehicle and including recording means for recording at least indications of the speed of the vehicle, the combination comprising input means coupled to a drive of the vehicle for providing distance pulses indicative of the distance travelled by the vehicle, speed indicator means including a rotatable speed shaft for controlling an indicating apparatus which indicates the speed of the vehicle, timing means operable to provide timing pulses, speed drive means responsive to said distance pulses and said timing pulses for deriving a control output representing the measured vehicle speed, digital encoder means coupled to said speed shaft for providing a sense output indicative of the position of said speed shaft and thus the indicated vehicle speed, and comparator means responsive to said control output which represents the measured speed and said sense output which represents the indicated speed for controlling the positioning of said speed shaft to enable said indicating apparatus to indicate the measured speed of the vehicle, said recording means being responsive to said timing means and said control output for recording an indication of the speed of said vehicle in relation to time.

22. An electronic tachograph as set forth in claim 21 wherein said comparator means is operable to provide a first output for effecting rotation of said speed shaft in one direction whenever the control output supplied thereto indicates an increase in the vehicle speed, said comparator means being operable to provide a second output for effecting rotation of the speed shaft in the opposite direction whenever the control output supplied thereto indicates a decrease in the vehicle speed.

23. An electronic tachograph as set forth in claim 22 wherein said digital encoder means includes a code disc mounted on said speed shaft and rotatable therewith, said code disc having a pattern of clear and opaque areas coded to represent a plurality of positions for said speed shaft, light detector means disposed adjacent the one side of said code disc and connected to inputs of said comparator means, and light source means disposed adjacent the other side of said code disc for directing light toward said code disc to enable said light detector means to provide a sense output indicative of the angular position of said speed shaft.

24. An electronic tachograph as set forth in claim 23 wherein said code disc comprises a sheet of transparent material having opaque areas photographically reproduced thereon to provide said code pattern.

25. In an electronic tachograph for use with a vehicle and including recording means for recording at least indications of the speed of the vehicle, the combination comprising input means coupled to the drive of the vehicle for providing distance pulses indicative of the distance travelled by the vehicle, timing means operable to provide timing pulses, pulse counter means, pulse sampling means responsive to said timing pulses for sampling said distance pulses during sampling periods of a preselected duration to enable a predetermined number of said distance pulses to be extended to said pulse counter means during a given sampling period for a predetermined distance of vehicle travel, whereby the number of pulses counted by said counter means during each sampling period corresponds to the speed of the vehicle, speed indicator means including a rotatable speed shaft for controlling an indicating apparatus which indicates the speed of the vehicle, drive means operable to effect rotation of said speed shaft for indicating the speed of the vehicle, and control means responsive to said counter means for providing a control output to said drive means whenever the vehicle speed changes for indicating a desired correction in the position of said speed shaft, and said recording means being controlled by said drive means and said timing means for recording an indication of the speed of the vehicle in relation to time.

26. An electronic tachograph as set forth in claim 25 wherein said drive means includes a reversible stepping motor means, and switching means for applying drive signals to said stepping motor means, said control means including steering gate means responsive to said control output for extending an enabling signal to said drive means to effect the application of drive signals of a phase which effects respositioning of said speed shaft to control said speed indicating means to indicate the measured speed of the vehicle.

27. An electronic tachograph as set forth in claim 26 wherein said control means includes memory means which stores signals representing the phase of the drive signals applied to said stepping motor means and provides outputs to said steering gate means to enable said drive means to provide the desired phase for the drive signals supplied to said stepping motor means.

28. In an electronic tachograph for use with a vehicle and including recording means for recording at least indications of the speed of the vehicle, the combination comprising input means coupled to the drive of the vehicle for providing distance pulses indicative of the distance travelled by the vehicle, timing means operable to provide timing pulses, pulse counter means, pulse sampling means responsive to said timing pulses to enable a predetermined number of pulses to be extended to said pulse counter means for a predetermined distance of vehicle travel, whereby the number of pulses counted by said counter means during a predetermined time period corresponds to the speed of the vehicle, speed indicator means including a rotatable speed shaft for controlling an indicating apparatus which indicates the speed of the vehicle, drive means energizable to effect rotation of said speed shaft for indicating the speed of the vehicle, control means responsive to said counter means for providing a control output to said drive means whenever the vehicle speed changes for indicating a desired correction in the position of said speed shaft, homing switch means responsive to a predetermined condition for providing a control input to said pulse counter means causing said speed shaft to be rotated to a predetermined position and said recording means being controlled by said drive means and said timing means for recording an indication of the speed of said vehicle in relation to time.

29. In an electronic tachograph including a speedometer apparatus including a speed shaft rotatable to position a speed pointer relative to a speedometer dial to indicate instantaneous speed for a vehicle, an odometer apparatus including an odometer shaft movable to drive a mileage indicator to register the distance travelled by the vehicle, and chart recording means having a movable recording chart, a speed stylus means coupled to said speed shaft for movement on said recording chart for recording the speed of the vehicle in relation to time, an odometer stylus coupled to said odometer shaft for movement on said chart for recording the distance travelled by the vehicle in relation to time, and electronic control apparatus for driving said chart recording means and for positioning said speed shaft and said odometer shaft, said electronic control apparatus comprising input means coupled to a speed drive of said vehicle for providing distance pulses indicative of the distance travelled by said vehicle, first pulse counter means, timing means for providing timing pulses, adjustable means responsive to said timing pulses for periodically sampling said distance pulses during sampling periods of a preselected duration for enabling a predetermined number of said distance pulses to be extended to said first pulse counter means during a given sampling period for a predetermined distance of travel to enable said first pulse counter means to provide an output representative of the speed of said vehicle, speed drive means coupled to said shaft and responsive to said output of said first pulse counter means to position said speed shaft at a position indicative of the speed of the vehicle, second pulse counter means responsive to said predetermined pulses provided by said adjustable means to provide an output indicative of the distance travelled by said vehicle, distance drive means coupled to said odometer shaft and responsive to said output of said second pulse counter means to move said odometer shaft in accordance with the distance travelled by said vehicle, and clock drive means responsive to said timing pulses for driving said recording chart means to move said recording chart relative to said speed stylus and said odometer stylus.

30. In an electronic tachograph including a speedometer apparatus including a speed shaft rotatable to position a speed pointer relative to a speedometer dial to indicate instantaneous speed for a vehicle, an odometer apparatus including an odometer shaft movable to drive a mileage indicator to register the distance travelled by the vehicle, and chart recording means having a movable recording chart, a speed stylus means coupled to said speed shaft for movement on said recording chart for recording the speed of the vehicle in relation to time, an odometer stylus coupled to said odometer shaft for movement on said chart for recording the distance travelled by the vehicle in relation to time, and electronic control apparatus for driving said chart recording means and for positioning said speed shaft and said odometer shaft, said electronic control apparatus comprising input means coupled to a speed drive of said vehicle for providing distance pulses indicative of the distance travelled by said vehicle, first pulse counter means, timing means for providing timing pulses, adjustable means responsive to said timing means for enabling a predetermined number of distance pulses to be extended to said first pulse counter means to enable said first pulse counter means to provide an output representative of the speed of said vehicle, speed drive means coupled to said speed shaft and responsive to said output of said first pulse counter means to position said speed shaft at a position indicative of the speed of the vehicle, second pulse counter means controlled by said adjustable means to provide an output indicative of the distance travelled by said vehicle, distance drive means coupled to said odometer shaft and responsive to said output of said second pulse counter means to move said odometer shaft in accordance with the distance travelled by said vehicle, clock drive means responsive to said timing pulses for driving said recording chart means to move said recording chart relative to said speed stylus and said odometer stylus, and idler means responsive to said timing means for sampling the output of said first pulse counter means and for providing a control output for said speed drive means whenever said vehicle is idling to effect periodic movement of said speed stylus for recording on said chart of an indication of the idling time of said vehicle.

* * * * *